(12) United States Patent
Kabuki et al.

(10) Patent No.: US 7,953,312 B2
(45) Date of Patent: May 31, 2011

(54) LIGHT GUIDING MEMBER AND BIFURCATED LINEAR LIGHT SOURCE APPARATUS

(75) Inventors: Kiyoyuki Kabuki, Hyogo (JP); Hiroshige Hata, Hyogo (JP); Koichi Kamei, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/230,491

(22) Filed: Aug. 29, 2008

(65) Prior Publication Data

US 2009/0003784 A1    Jan. 1, 2009

(30) Foreign Application Priority Data

Mar. 1, 2007   (JP) .................................. 2007-051039

(51) Int. Cl.
G02B 6/10 (2006.01)
F21V 5/00 (2006.01)

(52) U.S. Cl. .......................... 385/146; 362/327; 362/620

(58) Field of Classification Search .................. None
See application file for complete search history.

(56) References Cited

U.S. PATENT DOCUMENTS

| | | | |
|---|---|---|---|
| 6,784,948 B2 * | 8/2004 | Kawashima et al. | 349/12 |
| 7,254,309 B1 * | 8/2007 | Chou et al. | 385/146 |
| 7,347,610 B2 * | 3/2008 | Chang et al. | 362/621 |

FOREIGN PATENT DOCUMENTS

| | | |
|---|---|---|
| JP | 2000-59571 A | 2/2000 |
| JP | 2001-159796 A | 6/2001 |
| JP | 2005-229647 A | 8/2005 |

* cited by examiner

*Primary Examiner* — Tina M Wong
(74) *Attorney, Agent, or Firm* — Rader, Fishman & Grauer PLLC

(57) ABSTRACT

A light guiding member having a light direction changing face which extends in a longitudinal direction of the light guiding member and a light emitting face which faces the light guiding member, wherein the light direction changing face includes two faces arranged so that vertical faces which extend in the longitudinal direction and are respectively vertical to the two faces, intersect with each other. Also, a bifurcated linear light source apparatus comprises a LED, a light guiding member which is made up of a transparent rod shape member, and which emits light generated by the LED, in two directions, from a longitudinal direction side face of the transparent rod shape member, and a reflection mirror which reflects the light emitted in one of the two directions, to the other direction of the two directions.

15 Claims, 9 Drawing Sheets $\theta 1 > \theta 2$ $\theta 1 < \theta 2$

LIGHT GUIDING MEMBER AND BIFURCATED LINEAR LIGHT SOURCE APPARATUS

CROSS-REFERENCES TO RELATED APPLICATION

The disclosure of Japanese Patent Application No. 2007-051039, filed Mar. 1, 2007, including its specification, claims and drawings, is incorporated herein by reference in its entirety.

TECHNICAL FIELD

The present invention relates to a light guiding member and a bifurcated linear light source apparatus, and particularly relates to a light guiding member and a bifurcated linear light source apparatus used as an illumination light source of an image reading apparatus such as a facsimile, a copying machine, an image scanner, a bar code reader, etc.

BACKGROUND

In recent years, in an image reading apparatus, such as a personal facsimile, small light emitting diodes (hereinafter referred to as an LEDs) with a low power are starting to be used as a light source of a reading light source apparatus, due to improvements in an output of such LEDs and a raise in the sensitivity of a CCD type sensor as a light receiving element. In a conventional linear light source apparatus equipped with such LEDs as light sources, the number of the light sources is reduced and a light guiding member in which light emitted from the light source enters the light guiding member and the light is led towards a desired direction, is used so as to obtain uniform lighting intensity.

Japanese Laid Open Patent No. 2001-159796 discloses a light guiding member in which a light direction changing face having an inverted V character shape in a cross sectional view thereof taken along a short side direction thereof is formed at a position facing the light emitting face. Since the light emitting face having the curvature which is smaller than those of other portions is formed, the light which is emitted from the light emitting face is condensed, and, for example, the light having directivity is irradiated to a document face.

Moreover, Japanese Laid Open Patent No. 2000-59571 discloses a light guiding member whose light emitting face has a lens face shape which consists of a shape of such as a circular arc or an arc of an ellipse, in a cross sectional view thereof taken along a short side direction of the light guiding member, in which two light direction changing faces are provided at positions where they face the light emitting face.

Moreover, Japanese Laid Open Patent No. 2005-229647 discloses a light source apparatus having two light emitting units facing each other, in each of which a light source is disposed on an end face of each light guiding member. The light guiding member is made of resin having high optical permeability, such as acrylics and polycarbonate, or optical glass having high optical permeability, and a light emitting face is formed on one side surface. For example, one or more face mounting type LED is attached to the light source. While the light which enters the one end face of a light guiding member from the LED, is reflected inside the light guiding member, the light is guided in a longitudinal direction, so as to emit the light in a direction of an arrow from the light emitting face. Each lighting unit is arranged so that light emitted from each light emitting face may be irradiated onto a document reading face in a document face, that is, each of them irradiates the same document reading face area.

However, since the light guiding member disclosed in Japanese Laid Open Patent No. 2001-159796 or 2000-59571, irradiates light to the document reading face from one direction, if there are creases or uneven portions formed by pasting, on a paper face which is a work piece to be irradiated, a shadow is produced. Moreover, since in the light source apparatus disclosed in Japanese Laid Open Patent No. 2005-229647, light is irradiated to a document reading face from two directions, a shadow is not produced even if there are creases or uneven portions formed by pasting. However, since it is necessary to arrange two light guiding members, the entire apparatus becomes large and demand of a miniaturization cannot be achieved.

In view of the above mentioned problem, described below is a light guiding member and a bifurcated linear light source apparatus capable of irradiating light to a document reading face from two directions and realizing the miniaturization of apparatus.

According to one aspect of embodiments, the present light guiding member has a light direction changing face which extends in a longitudinal direction of the light guiding member and a light emitting face which faces the light guiding member, wherein the light direction changing face includes two faces arranged so that vertical planes which extend in the longitudinal direction and are respectively vertical to the two faces, intersect with each other. Since the light direction changing face of the light guiding member is formed by two faces arranged so that vertical planes which are vertical to the respective two faces extending in a longitudinal direction may intersect with each other, whereby light can be emitted in two directions from one light guiding member. When the light guiding member is applied to a light source apparatus, irradiation of the light to a document reading face from two directions is easily configured.

According to another aspect of embodiments, a relation of $\theta1 \geqq \theta2$ may be satisfied, when an intersection angle formed by the vertical planes at an intersection thereof is represented as $\theta1$, and an angle which is formed by center-of-curvature lines which pass through respective two intersection points of the vertical faces and the light emitting face, is represented as $\theta2$. The "center-of-curvature line" means a line which passes through the center point of a circle or a curved surface of a light emitting face. In the case, since the angle of each light which is emitted from the light emitting face becomes large, areas where the light direction changing face and the light emitting face are formed, can be narrowed, so that the flexibility of the design is improved when a shape design is performed, and a formation of the projection section for reinforcing the light guiding member becomes easy, and further, fixation of the light guiding member to the light source apparatus becomes easy.

According to still another aspect of embodiments, in the light guiding member, the light direction changing face may be in a concave shape, with respect to a short side direction of the light guiding member. When each light direction changing face of the light guiding member is formed in the shape of a concave with respect to the direction of a short side of the light guiding member, the light whose direction is changed by the light direction changing face is converged so as to be incident on the light emitting face, so that it is possible to respectively converge and emit light which is emitted in the two directions from the light emitting face, regardless of the shape of the light emitting face.

According to a further aspect of embodiments, the present light guiding member may be in a rod shape, which has a light direction changing face which extends in a longitudinal direction of the light guiding member and a light emitting face which faces the light guiding member, wherein the light emitting face of the light guiding member is formed of two curved surfaces in which respective curvatures thereof are equal to or different from each other. Thus, since the light emitting face of the light guiding member is formed of two curved surfaces in which the curvatures thereof are equal to or different from each other, it becomes easy to converge and emit light, which is emitted in the two directions from the light emitting face, in arbitrary directions respectively.

According to a still further aspect of embodiments, a bifurcated linear light source apparatus comprises a LED, a light guiding member which is made up of a transparent rod shape member, and which emits light generated by the LED, in two directions, from a longitudinal direction side face of the transparent rod shape member, and a reflection mirror which reflects the light emitted in one of the two directions, to the other direction of the two directions. Thus, the structure for irradiating the light from two directions to a document reading face becomes simple. Moreover, since only one light guiding member is used, the miniaturization of apparatus can be realized.

According to a still further aspect of embodiments, a bifurcated linear light source apparatus may comprise the above light guiding member, a light source provided so as to face an optical incidence section which is provided at least in one of both ends of the light guiding member in the longitudinal direction, and a reflection mirror which reflects light emitted from the light emitting face in one of the two directions, to the other direction of the two directions, in which a length of the reflection mirror is the same as that of the light emitting face of the light guiding member, and the reflection mirror is provided in a position approximately symmetrical to the light emitting face with respect to a face vertical to a center of a document reading face. Thereby, the structure for irradiating the light from the two directions to the document reading face becomes simple, and moreover, since only one light guiding member is used, the miniaturization of apparatus can be realized.

BRIEF DESCRIPTION OF THE DRAWINGS

Other features and advantages of the present light guiding member and bifurcated linear light source apparatus will be apparent from the ensuing description, taken in conjunction with the accompanying drawings, in which:

FIG. 3 is a cross sectional view of a light guiding member 1, taken along a vertical plane in a longitudinal direction from the center of a first light direction changing face 4a;

DESCRIPTION

The descriptions in the specification are provided for illustrative purposes only, and are not limiting thereto. An appreciation of various aspects of the present light guiding member and bifurcated linear light source apparatus are best gained through a discussion of various examples thereof. The meaning of these terms will be apparent to persons skilled in the relevant arts based on the entirety of the teachings provided herein.

Figure 1:
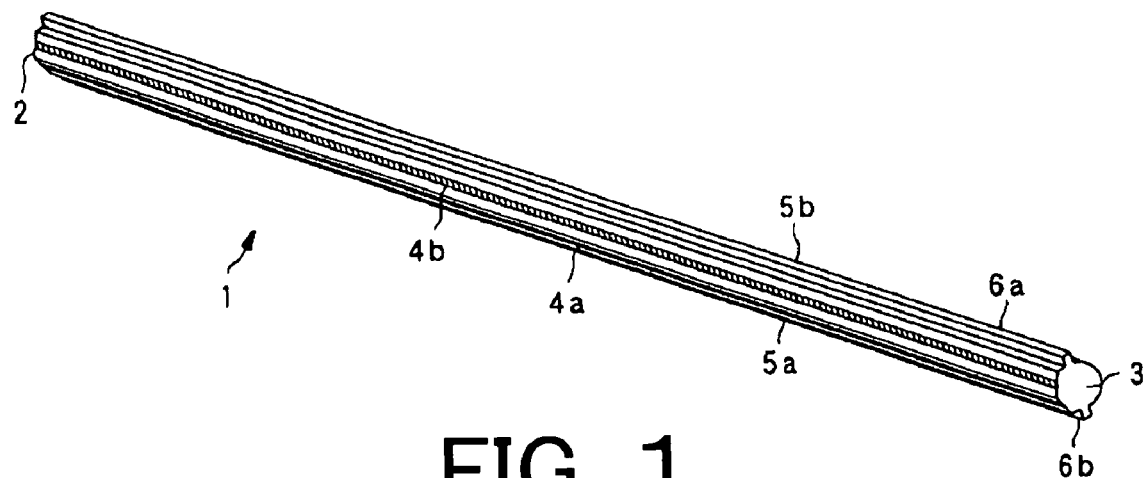
FIG. 1 is a perspective diagram of a light guiding member 1 according to a first embodiment.

A first embodiment will be described, referring to FIGS. 1 to 5. FIG. 1 is a perspective view of a light guiding member 1 according to of the embodiment. In this figure, a light incidence face 2 is formed in one end face of the light guiding member 1 in a longitudinal direction thereof. The light guiding member 1 has the other side face 3 in the longitudinal direction thereof. A pair of projection sections 6a and 6b is provided on the side faces of the light guiding member 1 between light direction changing portions (reflective faces) 4a and 4b and light emitting faces 5a and 5b. The light guiding member 1 is made of rod-shape transparent acrylic resin. The light guiding member 1 is formed in a shape of thin rod whose radius is Φ5-Φ6, and whose length is 320 mm. The light guiding member 1 may be bent only by being held at both ends of the light guiding member 1 so that a lighting position is shifted. Therefore, the pair of projection sections 6a and 6b is provided in order to make fixation and holding thereof easy. The light guiding member 1 has the optical incidence face 2 provided at at least one of end surfaces of the light guiding member 1 in the longitudinal direction thereof. The first light direction changing face 4a and the second light direction changing face 4b are formed on the side faces extending in the longitudinal direction of the light guiding member 1. The first light direction changing face 4a and the second light direction changing face 4b are formed so that planes, which are vertical to the first light direction changing face 4a and the second light direction changing face 4b, and which extend in the longitudinal direction of the light guiding member 1, may intersect with each other. Moreover, the light emitting faces 5a and 5b which face the first light direction changing face 4a and the second light direction changing face 4b are formed in another side extending in the longitudinal direction of the light guiding member 1. The light emitting faces 5a and 5b form a common face, which has an approximately semicircle shape in a cross sectional view thereof.

Figure 2:
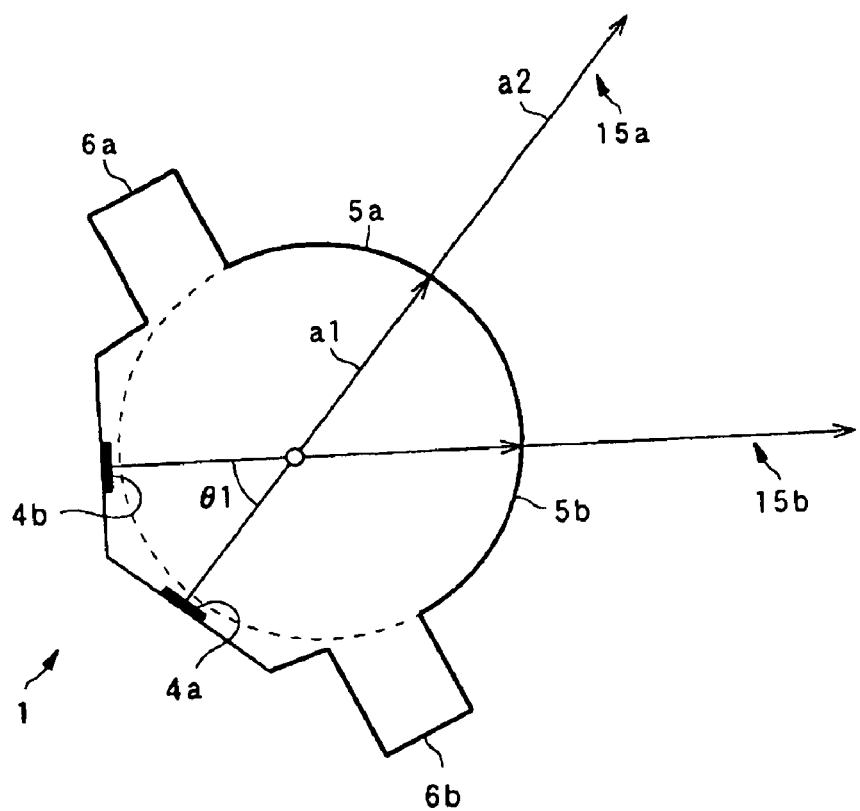
FIG. 2 is a projection drawing which is viewed from one end face on a longitudinal direction of the light guiding member 1 shown in FIG. 1.

FIG. 2 is a projection drawing (or cross sectional view) of the light guiding member 1 having the first light direction changing face 4a and the second light direction changing face 4b, which is shown in FIG. 1, the projection drawing being viewed from one end face in the longitudinal direction, that is, the light incidence face 2 or the other end face 3 in the longitudinal direction. In this projection drawing, the first light direction changing face 4a and the second light direction changing face 4b are shown as line segments 4a and 4b. A line which is perpendicular to the first light direction changing face 4a shown as the line segment in the projection drawing, and which extends toward the light emitting face 5a from the center of the first light direction changing face 4a, is represented as a first vertical line 15a. Similarly, a line which is perpendicular to the second light direction changing face 4b shown as the line segment in the projection drawing, and which extends toward the light emitting face 5b from the center of the second light direction changing face 4b, is represented as a second vertical line 15b. These two vertical lines, that is, the first vertical line 15a and the second vertical line 15b, intersect with each other, forming an angle θ1. In addition, the first vertical line 15a and the second vertical line 15b extend in the longitudinal direction in the perspective view, as shown in FIG. 1, so as to form faces extending in the longitudinal direction. The virtual face which includes the first vertical line 15a or the second vertical line 15b, and which extends in the longitudinal direction of the light guiding member 1 is hereinafter referred to as "a vertical plane extending in the longitudinal direction with respect to the light direction changing face".

Figure 3:
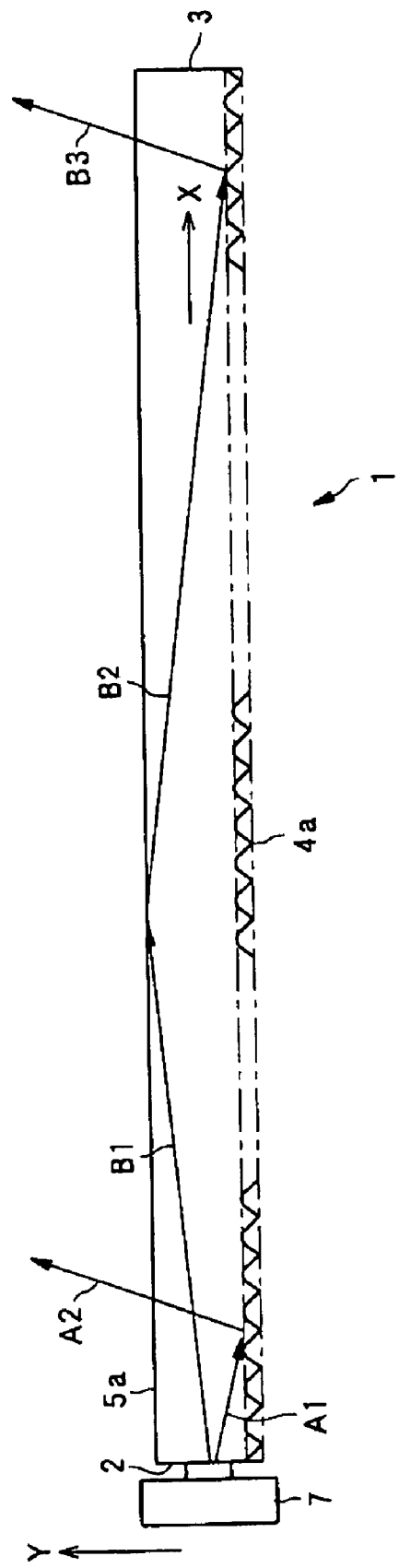

The first light direction changing face 4a and the second light direction changing face 4b respectively have a large number of a mountain and slot portion consisting of concavities and convexities which are formed in parallel in the longitudinal direction, as shown as the first light direction changing face 4a of FIG. 3. Therefore, since the first light direction changing face 4a and the second light direction changing face 4b are formed in shape of a plane, processing of a metal mold which is used when the light guiding member 1 is manufactured by injection molding becomes easy. Moreover, the length of the first light direction changing face 4a and the second light direction changing face 4b in a direction of a short side is 0.5 to 0.2 mm, for example, 1 mm. The first light direction changing face 4a and the second light direction changing face 4b are arranged so as to be apart from each other so that the intersection angle θ1 may be 45-65 degrees, for example, 55 degrees. Furthermore, the first light direction changing face 4a and the second light direction changing face 4b are disposed so that the first vertical line 15a and the second vertical line 15b may intersect with each other at the center point of the semicircle of the light emitting faces 5a and 5b of the light guiding member 1. The first light direction changing face 4a and the second light direction changing face 4b are also arranged so as to be away from the center point of the semicircle by a radius distance or more in a direction toward the light direction changing faces from the center point, so that the convergency of light which is emitted from the light emitting faces 5a and 5b is improved.

Since the large number of slots consisting of concavities and convexities are formed in parallel at the longitudinal direction on the first light direction changing face 4a and the second light direction changing face 4b, light which enters from the optical incidence face 2, is efficiently guided in the longitudinal direction of the light guiding member 1, i.e., the other end face 3 direction, while repeating total reflection within the light guiding member 1. The directions of the light having angle components, which is guided in the longitudinal direction, are changed to directions of the light emitting face 5b and the light emitting face 5a (a direction of approximately 90 degree therefrom) which the first light direction changing face 4a and the second light direction changing face 4b face respectively, by the first light direction changing face 4a and the second light direction changing face 4b. The light is emitted from the light emitting face 5a and the light emitting face 5b according to the Snell's law.

FIG. 3 is a cross sectional view of the light guiding member 1 shown in FIG. 1, taken along a vertical plane in the longitudinal direction, which passes through the center of the first light direction changing face 4a. In this figure, a light source is made up of LED(s). A light source 7 is arranged in a direction in which light therefrom is irradiated to the light incidence section 2 formed in the one end in the longitudinal direction of the light guiding member 1. The light source 7 and the light guiding member 1 are provided apart from each other at a very close distance. The light emitted from the light source 7 is emitted into the atmosphere, and then enters inside the light guiding member 1. The light which enters the light guiding member 1 from the light source 7 is totally reflected in the light guiding member 1, and is guided in the longitudinal direction X. In the process of guiding the light, the light which enters in slopes of the mountain and slot portion formed by the concavo-convex slots of the light direction changing face 4a changes the direction to a direction Y of a short side (width) of the light guiding member 1, and is emitted from the light emitting face 5a. Since the angle of the slopes of the concavo-convex forming the mountain and the slot portion on the light direction changing face 4a is adjusted so that the light A1 from the light source 7 becomes light A2 which is emitted approximately perpendicularly to the light emitting face 5a, the light A1 which enters the slopes of the concavo-convex portion forming slots of the light direction changing face 4a turns into the light A2 which propagates in the width direction Y of the light guiding member 1 toward the light emitting face 5a from the light direction changing face 4a. Moreover, the light B1 which enters from the light source 7 to the light emitting face 5a is totally reflected on the light emitting face 5a, and becomes light B2 which propagates in the longitudinal direction X, maintaining an incident angle. Then, the reflected light B2 enters the slope of the concavo-convex slots of the light direction changing face 4a, and becomes light B3 which propagates in the direction Y of a short side (width) of the light guiding member 1 toward the light emitting face 5a from the light direction changing face 4a.

As shown in FIG. 3, intervals between the peaks of the concavo-convex portion forming the mountain and slot portion of the light direction changing face 4a, become wider as closer to the light source 7 and become narrower as distant from the light source 7. That is, the intervals between the peaks of the concavo-convex portion forming the mountain and slot portion of the light direction changing face 4a are adjusted so as to be narrower as they are away from the light source 7. Thus, by the above configuration, a probability that the light which enters from the light source 7 and which is changed in direction, can be adjusted to be constant or to be arbitrarily adjusted, so that desired irradiance distribution can be obtained. Moreover, although not shown, a film of aluminum is formed on an outer face of a portion on which the light direction changing face 4a of the light guiding member 1 is formed. The film of aluminum functions as a reflective film so that the light may not be emitted from the light direction changing face 4a to the outside of the light guiding member 1, whereby the stray light can be prevented while efficiently illuminating light to a side of a work piece to be irradiated.

Figure 4:
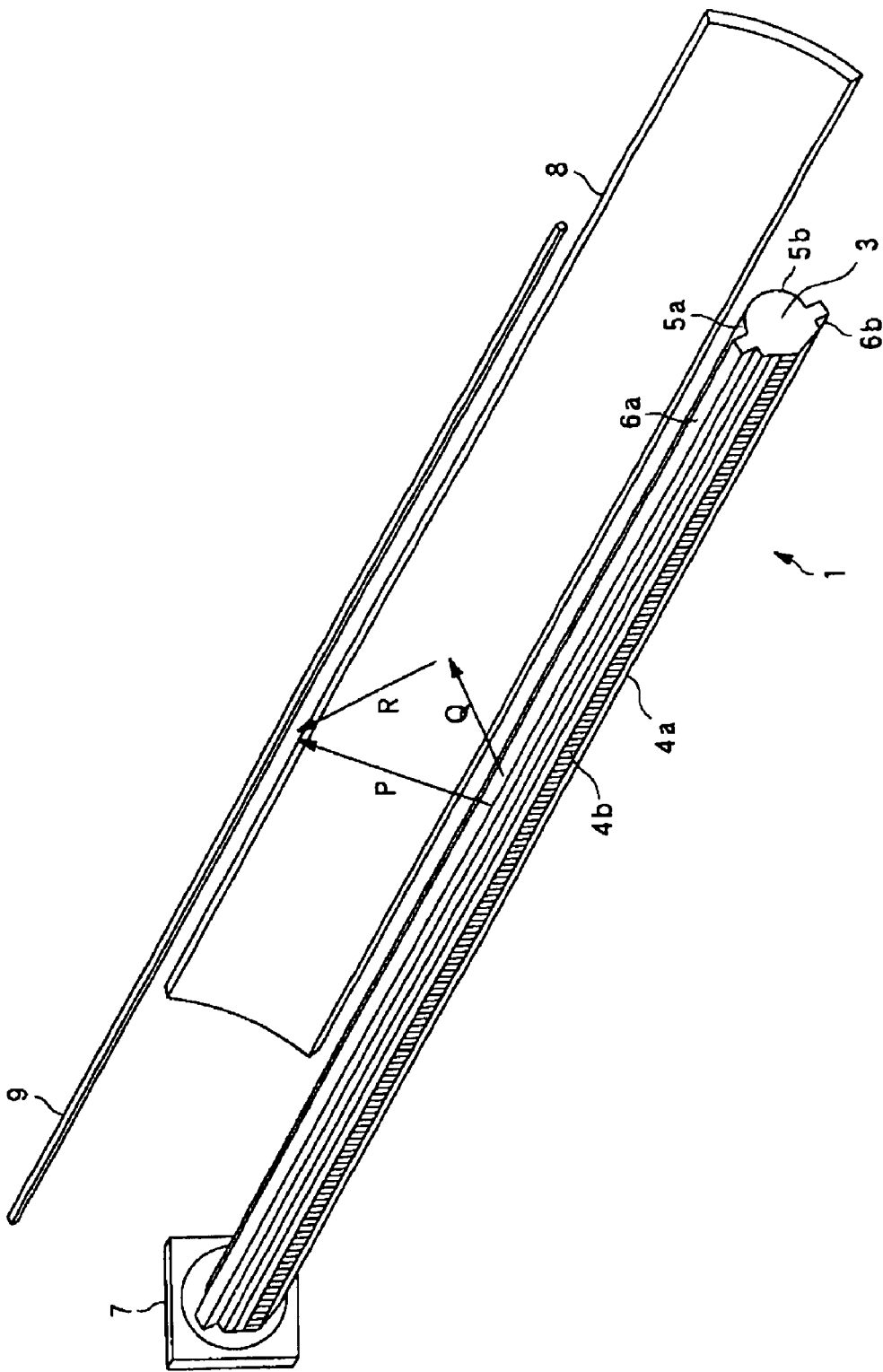
FIG. 4 is a perspective view of part of a bifurcated linear light source apparatus to which a light guiding member 1 shown in FIG. 1 to FIG. 3 is applied.
Figure 5:
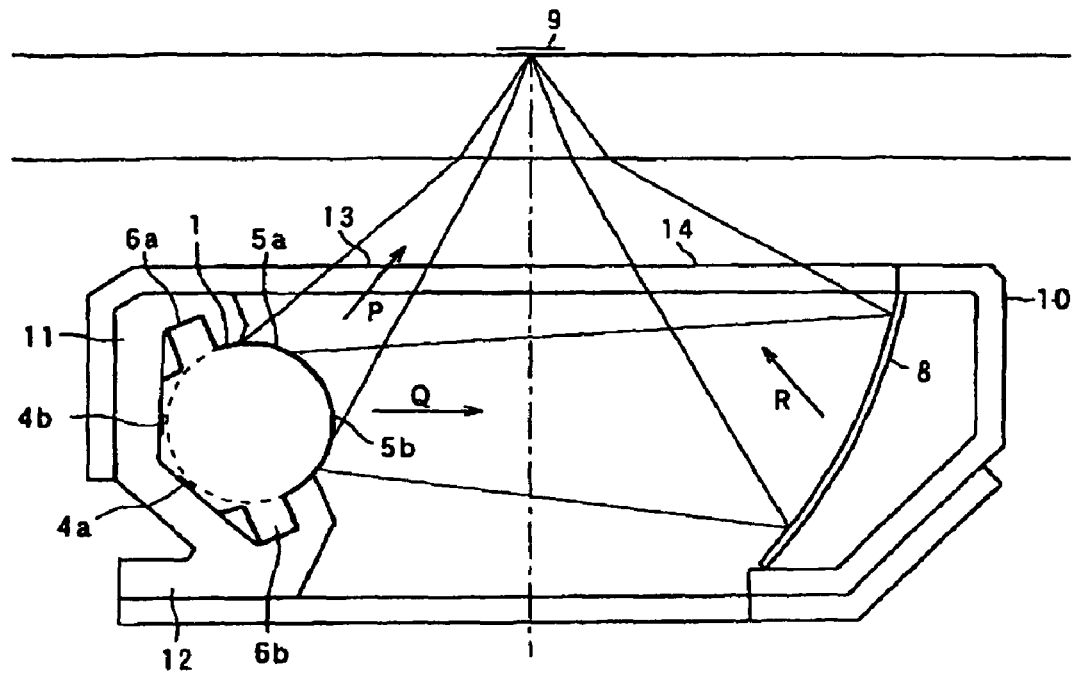
FIG. 5 is a cross sectional view of a bifurcated linear light source apparatus taken along a direction of a short side of a light guiding member 1 shown in FIG. 1 to FIG. 3.

FIG. 4 is a perspective view of part of a bifurcated linear light source apparatus, to which the light guiding member 1 shown in FIGS. 1-3 is applied, and FIG. 5 is a cross sectional view of the bifurcated linear light source apparatus, taken along a short side of the light guiding member 1. In these figures, the reflection mirror 8 is arranged at a position which is approximately symmetrical to the light guiding member 1 with respect to a face perpendicular to the center of the document reading face 9. A holding section 11 to which the light guiding member 1 is fixed, is formed approximately in a shape of a "⊐"character. A support section 12 which extends from the bottom and which fixes the light guiding member 1 is formed approximately in a shape of a "⊐"character. Transparent windows 13 and 14 through which light passes are provided in a case 10. In addition, the other structural elements correspond to those of the same numerals shown in FIG. 3.

The reflection mirror 8 is made up of a gutter-like shape mirror which has the same length as that of the first light direction changing face 4a and the second light direction changing face 4b in the longitudinal direction. For example, the mirror 8 has a luminance aluminium board or a reflective surface on which an aluminum film is formed. The shape thereof is an ellipse or a parabola in a cross sectional view. Thus, by the above configuration, the direction of the light which is emitted from the light emitting face 5b of the light guiding member 1 can be changed, so that the light is guided to the document reading face 9. In order that the reflection mirror 8 catches almost all the light which is emitted from the second light emitting face 5b of the light guiding member 1 and reflects it towards the document reading face 9, the reflection mirror 8 has such a size that it extends from the upper surface of the case 10 to the bottom face thereof. Further, it is more desirable that the window 14 be formed in a light guiding member 1 side of the case 10 from the reflection mirror 8 so as not to interrupt the reflected light. Furthermore, the light guiding member 1 and the reflection mirror 8 are fixed to the case 10. A pair of projection sections 6a and 6b is fixed so as to be located between the holding section 11 and the support section 12, and is held so as not to rotate. Since the light guiding member 1 is fixed and held in this way without using adhesives, it is possible to easily install it in an apparatus, without using an adhesive agent.

The light guiding member 1 and the light source 7 are provided apart from each other. Therefore, even if the incident angle of the light which is incident on the light guiding member 1 is close to 90 degrees, since the refractive index of the light guiding member 1 is about 1.5, the angle after the incidence (inside the light guiding member) exceeds the critical angle (42 degrees) with respect to the side face of the light guiding member 1. Therefore, there is no light which directly comes out from the side of the light guiding member 1, so that all the light that enters the light guiding member 1 from the light source 7 is totally reflected. The light which enters the light guiding member 1 is reflected on the first light direction changing face 4a and the second light direction changing face 4b through the inside of the light guiding member 1, so that the light is emitted as light P and light Q in two directions from the light emitting faces 5a and 5b respectively. The direct light P, and the reflected light R which is the light Q reflected on the reflection mirror 8, is irradiated on the document reading face 9.

Figure 6:
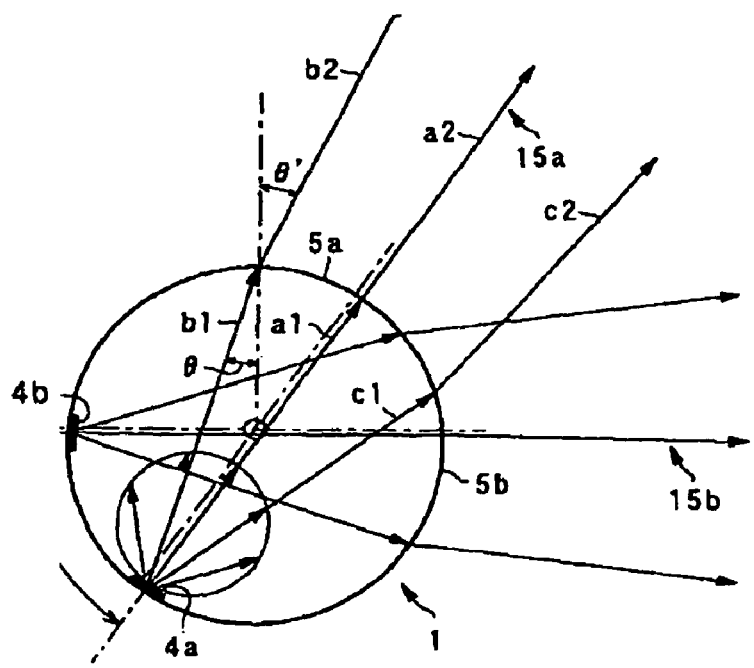
FIG. 6 is a projection drawing which is viewed from one end face in a longitudinal direction of the light guiding member 1 according to a second embodiment.
Figure 7A:
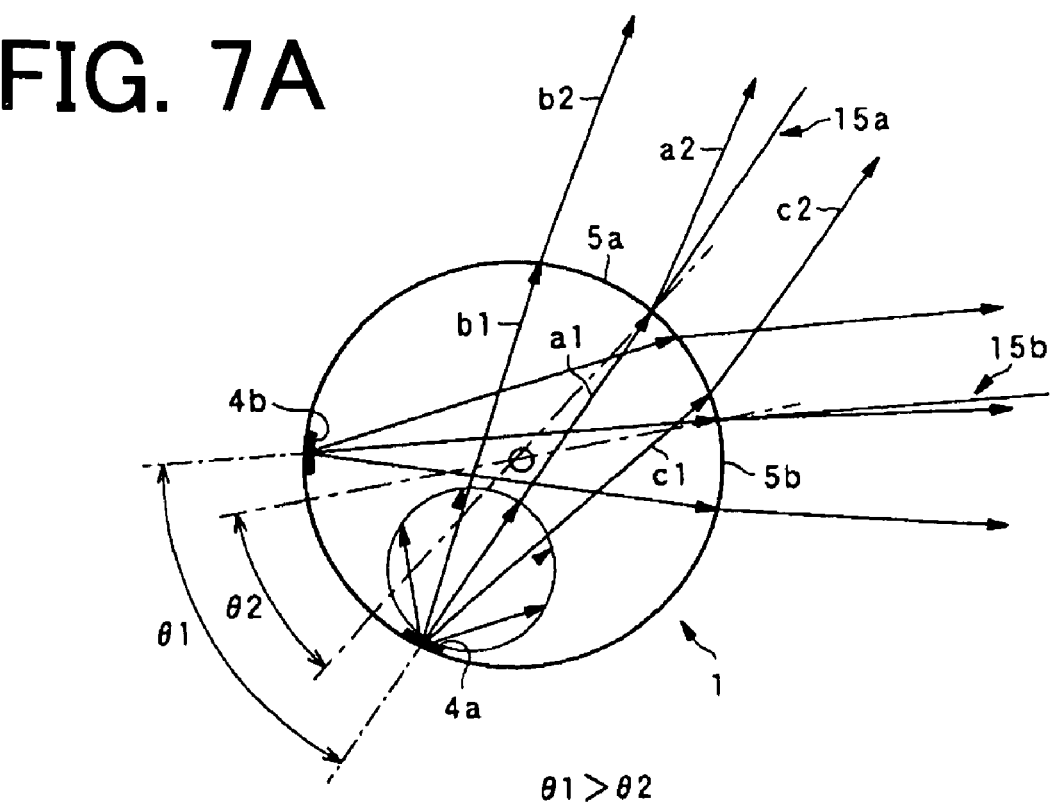
FIG. 7A is a projection drawing which is viewed from one end face in a longitudinal direction of the light guiding member 1 according to a second embodiment.
Figure 7B:
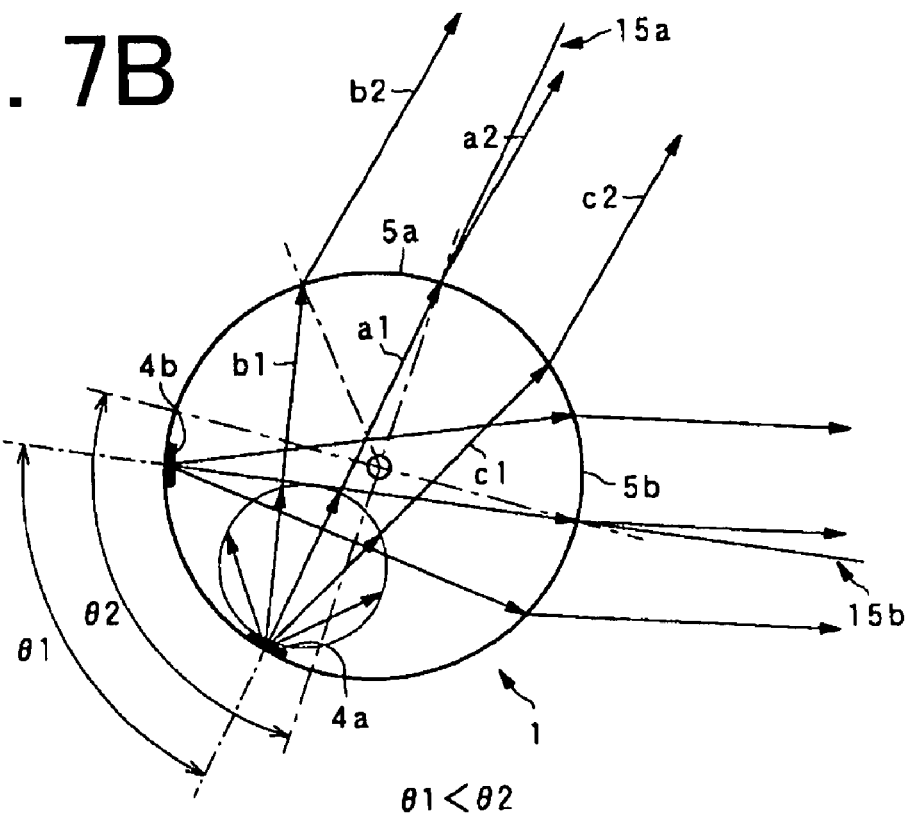
FIG. 7B is a projection drawing which is viewed from one end face in a longitudinal direction of a light guiding member 1 and which is shown for comparison with the light guiding member 1 according to a second embodiment.

A second embodiment of the present invention will be described, referring to FIGS. 6, 7A and 7B. FIGS. 6 and 7A are projection drawings of a light guiding member 1 having a first light direction changing face 4b and a second light direction changing face 4b, wherein the projection drawings are viewed from one end face in the longitudinal direction thereof, that is, a light incidence face 2 or the other end face 3 in the longitudinal direction thereof. FIG. 7B is a projection drawing viewed from the light incidence face 2 of the light guiding member 1 or the other end face 3 thereof in the longitudinal direction, in order to compare it with the light guiding member 1 shown in FIG. 7A. In addition, reference numerals of the structural elements shown in these figures correspond to those with the same numerals shown in FIG. 1. In the projection drawings shown as FIG. 6, the first light direction changing face 4a and the second light direction changing face 4b are shown as line segments 4a and 4b. A line which is perpendicular to the first light direction changing face 4a shown as a line segment in the projection drawing, and which extends toward the light emitting face 5a from the center of the first light direction changing face 4a, is represented as a first vertical line 15a. Similarly, a line which is perpendicular to the second light direction changing face 4b shown as a line segment in the projection drawing, and which extends toward the light emitting face 5b from the center of the second light direction changing face 4b, is represented as a second vertical line 15b. These two vertical lines, that is, the first vertical line 15a and the second vertical line 15b intersect with each other, forming an angle θ1. A virtual plane which includes the first vertical line 15a or the second vertical line 15b, and which extends in the longitudinal direction of the light guiding member 1 is hereinafter referred to as "a vertical plane extending in the longitudinal direction with respect to the light direction changing face". The first light direction changing face 4a and the second light direction changing face 4b, are in shape of a plane, respectively, and the width of the short side of each face is 1 mm. The first light direction changing face 4a and the second light direction changing face 4b are arranged so as to intersect with each other, so that an angle θ1 may be 55 degrees. Furthermore, as to the first light direction changing face 4a and the second light direction changing face 4b, the first vertical line 15a and the second vertical line 15b may intersect with the center point of the circle of the light emitting faces 5a and 5b of the light guiding member 1.

In FIG. 6, light which is emitted from a light source 7 (not shown) and then enters the optical incidence face 2 (not shown) of the light guiding member 1, is efficiently guided in the longitudinal direction of the light guiding member 1 while repeating total reflection within the light guiding member 1. The directions of the light having angle components, which is guided in the longitudinal direction, are changed to directions of the light emitting face 5b and the light emitting face 5a (a direction of approximately 90 degree therefrom) by the first light direction changing face 4a and the second light direction changing face 4b. The light is emitted from the light emitting face 5a and the light emitting face 5b according to the Snell's law. Since, for example, the light a1 whose direction is changed by the light direction changing face 4a passes through the center (the center of the circle of the light guiding member 1) of the light guiding member 1, the light is emitted without changing the angle at the light emitting face 5a. Moreover, light b1 and light c1 which is spread at an arbitrary angle θ with respect to a vertical plane vertical to the light direction changing face 4a, is incident on the light emitting face 5a at the incident angle θ, so that the light is emitted at an angle of $\theta' = \mathrm{Sin}(N*\mathrm{Sin}\ \theta)^{-1}$ with respect to the normal of a plane of incidence according to the Snell's law. Here, N means the refractive index of the light guiding member 1. Therefore, by adjusting the curvature of the light emitting face 5a or the distance between the light direction changing face 4a and the center of curvature of the light emitting face 5a, the light which spreads at the arbitrary angle θ is converged, so that it is possible to emit light in the same direction. In the light guiding member 1 shown in FIG. 6, since the first vertical line 15a and the second vertical line 15b intersect with each other at the central axis of the curvature radius (circle) of the light emitting faces 5a and 5b, the light is converged from light emitting faces 5a and 5b so as to be emitted in the same directions as those of the first vertical line 15a and the second vertical line 15b, respectively.

The projection drawings of the light guiding member 1 shown in FIGS. 7A and 7B are the same as that of the light guiding member 1 shown in FIG. 6. A line which is perpendicular to the first light direction changing face 4a shown as a line segment in the projection drawing, and which extends toward the light emitting face 5a from the center of the first light direction changing face 4a, is represented as a first vertical line 15a. Similarly, a line which is perpendicular to the second light direction changing face 4b shown as a line segment in the projection drawing, and which extends toward the light emitting face 5b from the center of the second light direction changing face 4b, is represented as a second vertical line 15b. These two vertical lines, that is, the first vertical line 15a and the second vertical line 15b intersect with each other, forming an angle θ1. A virtual plane which includes the first vertical line 15a or the second vertical line 15b, and which extends in the longitudinal direction of the light guiding member 1 is hereinafter referred to as "a vertical plane extending in the longitudinal direction with respect to the light direction changing face". In the light guiding member 1 shown in FIG. 7A, the first vertical line 15a and the second vertical line 15b intersect with each other outside the central axis of the cylindrical light guiding member 1. However, in the light guiding member 1 shown in FIG. 7B, the first vertical line 15a and the second vertical line 15b intersect with each other inside the central axis of the cylindrical light guiding member 1. That is, in the light guiding member 1 shown in FIG. 7A, an angle θ2 which is formed by normals at intersection points where a vertical plane containing the first vertical line 15a and a vertical plane containing the second vertical line 15b intersect with the light emitting faces 5a and 5b respectively, is smaller than the intersection angle θ1 which is formed by the first vertical line 15a and the second vertical line 15b which intersect with each other. On the other hand, in the light guiding member 1 shown in FIG. 7B, an angle θ2 which is formed by normals at intersection points where a vertical plane containing the first vertical line 15a and a vertical plane containing the second vertical line 15b intersect with the light emitting faces 5a and 5b respectively, is larger than the intersection angle θ1 which is formed by the first vertical line 15a and the second vertical line 15 which intersect with each other.

The angle area of the light emitting faces 5a and 5b of the light guiding member 1 shown in FIG. 7A, can be made smaller than the angle area of the light emitting faces 5a and 5b of the light guiding member 1 shown in FIG. 7B. Moreover, in the light guiding member 1 shown in FIG. 7A, the angle of the light which is emitted from the light emitting faces 5a and 5b becomes larger that that of the light guiding member 1 shown in FIG. 7B. Therefore, as in the light guiding member 1 shown in FIG. 7A, when the angle θ2 is made smaller than the angle θ1, the first light direction changing face 4a, the second light direction changing face 4b, and the area where the light emitting faces 5a and 5b are formed can be made small, whereby the flexibility of the design of the shape can be increased, and it becomes easy to manufacture the projection sections 6a and 6b, the holding section 11, and the support section 12 etc. as shown in FIG. 5.

Figure 8:
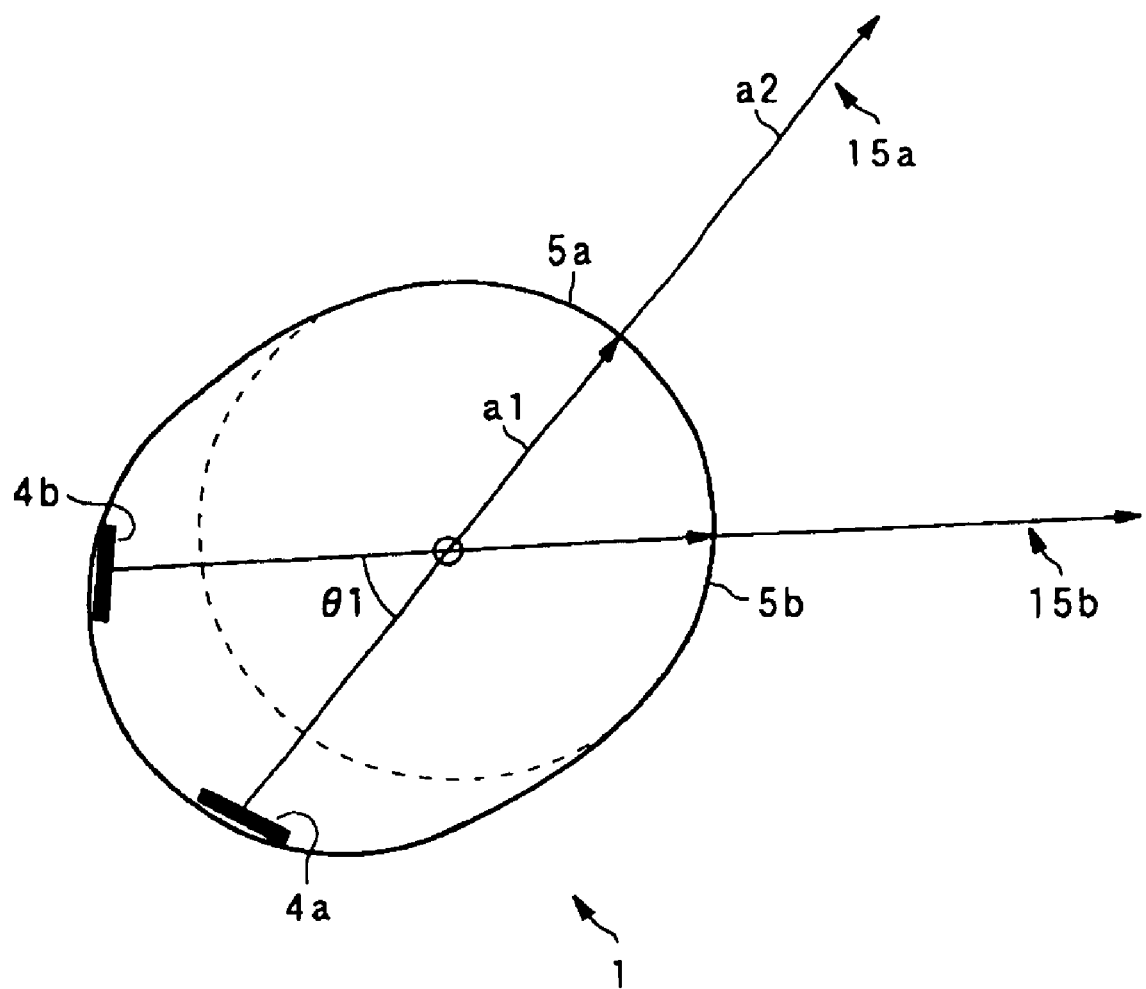
FIG. 8 is a projection drawing which is viewed from one end face in a longitudinal direction of a light guiding member 1 according to a third embodiment.

A third embodiment of the present invention will be described, referring to FIG. 8. FIG. 8 is a projection drawing of a light guiding member 1 having a first light direction changing face 4a and a second light direction changing face 4b, according to this embodiment, in which the light guiding member 1 is viewed from one end face in a longitudinal direction thereof. In addition, in these figures, structural parts with reference numerals which are the same as those shown in FIG. 1 correspond to the structural parts of FIG. 1 with the same reference numerals. A line which is perpendicular to the first light direction changing face 4a shown as a line segment in the projection drawing, and which extends toward a light emitting face 5a from the center of the first light direction changing face 4a, is represented as a first vertical line 15a. Similarly, a line which is perpendicular to the second light direction changing face 4b shown as a line segment in the projection drawing, and which extends toward a light emitting face 5b from the center of the second light direction changing face 4b, is represented as a second vertical line 15b. These two vertical lines, that is, the first vertical line 15a and the second vertical line 15b intersect with each other, forming an angle θ1. A virtual plane which includes the first vertical line 15a or the second vertical line 15b, and which extends in the longitudinal direction of the light guiding member 1 is hereinafter referred to as "a vertical plane extending in the longitudinal direction with respect to the light direction changing face". As shown in this figure, the first light direction changing face 4a and the second light direction changing face 4b are formed in one common semicircle, and the light emitting face 5a and light emitting face 5b are formed in a common semicircle in another side, and these semicircles are connected to each other via planes. The first light direction changing face 4a and the second light direction changing face 4b are arranged so as to be far away from the radius point of the one common semicircle of the light emitting faces 5a and 5b. By the above configuration, the convergency of the light emitted from the light emitting faces 5a and 5b can be improved.

Figure 9A:
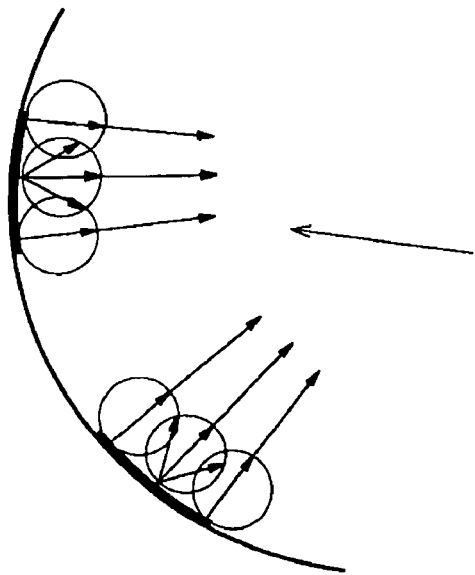
FIG. 9A is an enlarged view of a first light direction changing face 4a and a second light direction changing face 4b of a light guiding member 1 according to a fourth embodiment.
Figure 9B:
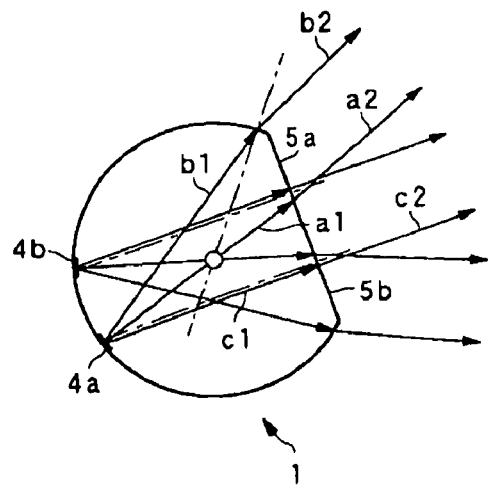
FIGS. 9B-9D are projection views which are viewed from one end face in a longitudinal direction of a light guiding member 1 according to a fourth embodiment.
Figure 9C:
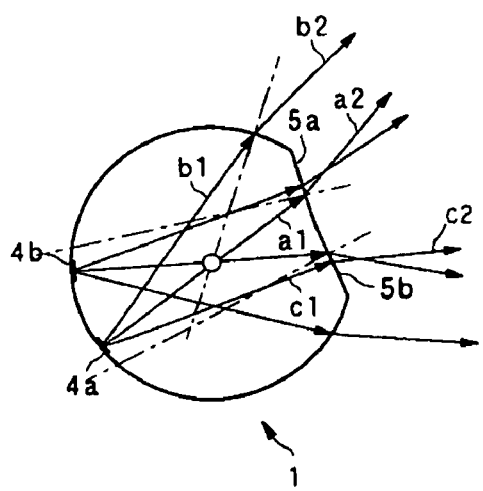
Figure 9D:
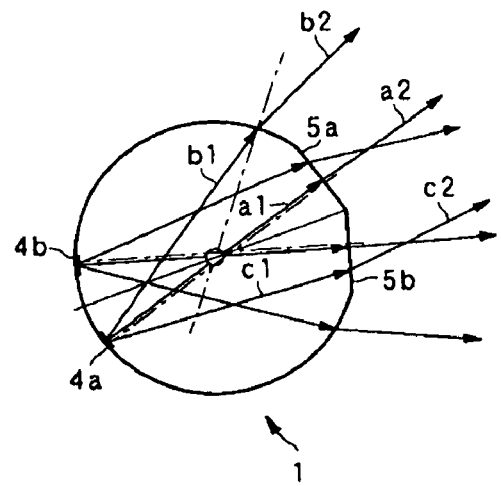

A fourth embodiment of the present invention will be described, referring to FIGS. 9A-9D. FIG. 9A is an enlarged view of a first light direction changing face 4a and a second light direction changing face 4b of the light guiding member 1 shown in FIGS. 9B-9D, FIG. 9B is a projection drawing which is viewed from one end face of the longitudinal direction of the light guiding member 1 according to this embodiment of the present invention, wherein a plane section (flat portion) is provided in part of the light emitting face 5a and 5b. FIG. 9C is a projection drawing which is viewed from one end face of the longitudinal direction of the light guiding member 1 according to this embodiment, wherein a plane section inclining inside the light guiding member 1 is provided in part of each light emitting face 5a or 5b. FIG. 9D is a projection drawing which is viewed from one end face in the longitudinal direction of the light guiding member 1 according to this embodiment, wherein a plane section inclining outside the light guiding member 1 is formed in part of each light emitting face 5a or 5b. In addition, in these figures, structural parts with reference numerals which are the same as those shown in FIG. 1 correspond to the structural parts of FIG. 1 with the same reference numerals. As shown in FIG. 9A, the first light direction changing face 4a and the second light direction changing face 4b of the light guiding member 1 which are shown in FIGS. 9B-9D are formed in the shape of a concave in the radius direction of the light guiding member 1. By the above configuration, for example, the light a1-c1 emitted from the first light direction changing face 4a can be converged, so as to be incident on the light emitting face 5a. Moreover, as shown in FIGS. 9B-9C, when the part of the light emitting faces 5a and 5b are formed in the plane shape, although the convergency of the light emitted from the light emitting faces 5a and 5b is sacrificed a little, the light flux and the direction of the light emitted from the light emitting faces 5a and 5b can be arbitrarily controlled.

Figure 10:
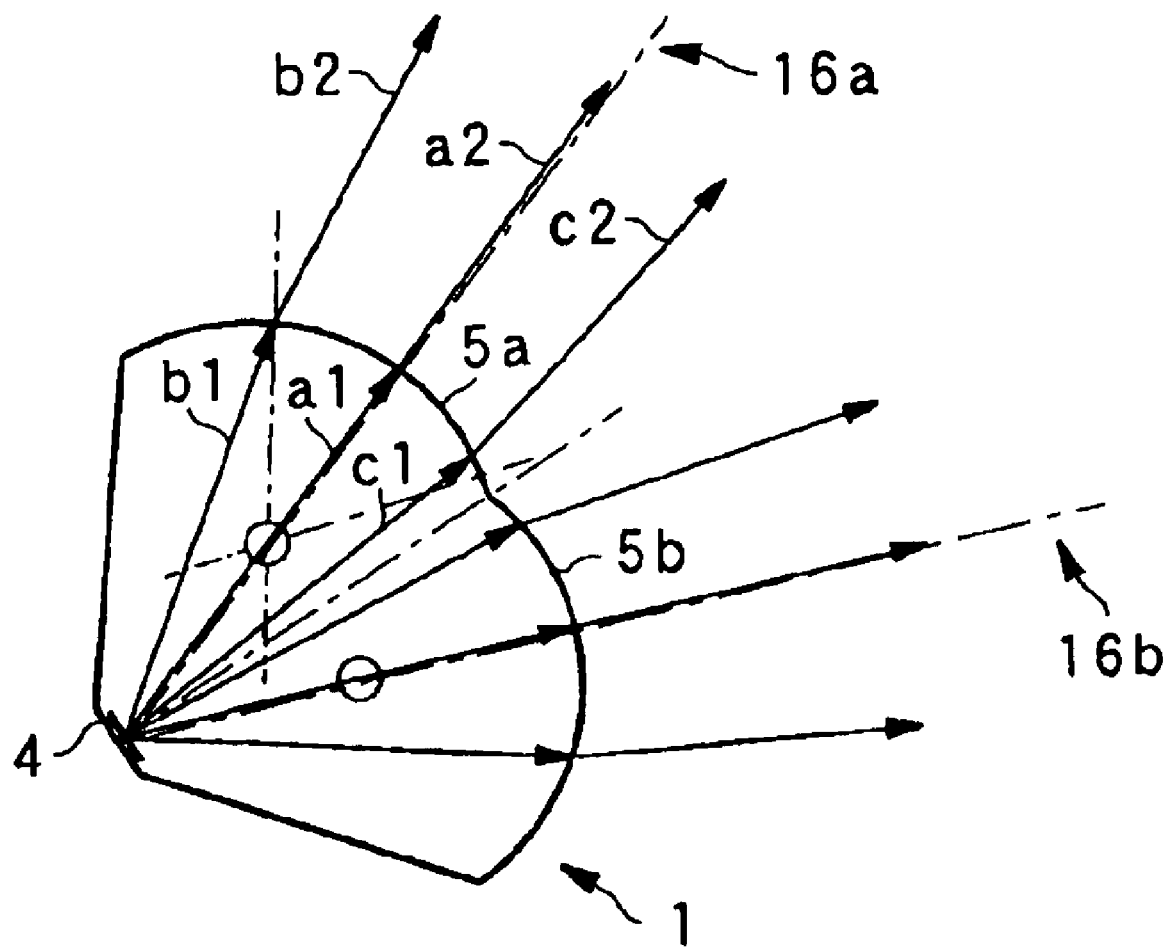
FIG. 10 is a projection drawing which is viewed from one end face in a longitudinal direction of a light guiding member 1 according to a fifth embodiment.

A fifth embodiment of the present invention will be described, referring to FIG. 10. FIG. 10 is a projection drawing which is viewed from one end face in a longitudinal direction of a light guiding member 1 according to this embodiment, wherein the light guiding member 1 has one light direction changing face 4, and a light emitting face 5a and a light emitting face 5b each of which has approximately an independent semicircle shape in a cross sectional view. In this figure, one light direction changing face 4 extends longitudinally in a side face of the light guiding member 1. The other structural parts with reference numerals which are the same as those shown in FIG. 1 correspond to the structural parts of FIG. 1 with the same reference numerals. As shown in this figure, a numeral reference 16a denotes the normal of the light emitting face 5a, and a numeral reference 16b denotes the normal of the light emitting face 5b. The light guiding member 1 has two curved faces, the light emitting face 5a and the light emitting face 5b, wherein the two curved faces are formed of approximately semicircles with angles different from each other, which respectively have the normals 16a and 16b. By the above configuration, the light which is deflected from the one light direction changing face 4 and is incident on the light emitting faces 5a and 5b, can be converged by the light emitting face 5a and the light emitting face 5b which are formed in approximately semicircles respectively, and then is emitted in different directions.

Figure 11A:
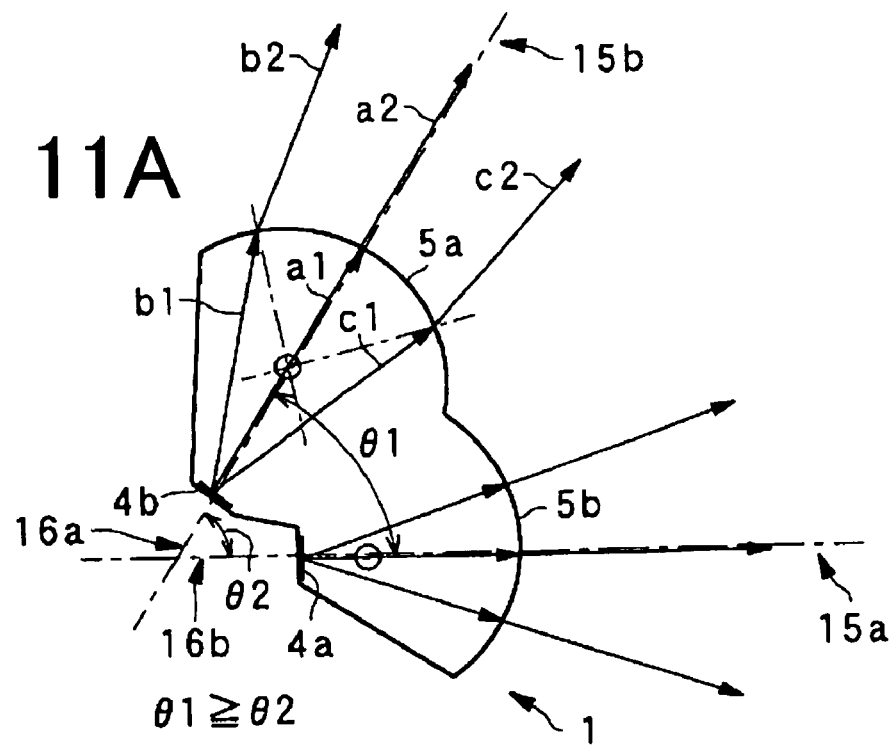
FIG. 11A is a projection drawing which is viewed from one end face in a longitudinal direction of a light guiding member 1 according to a sixth embodiment.
Figure 11B:
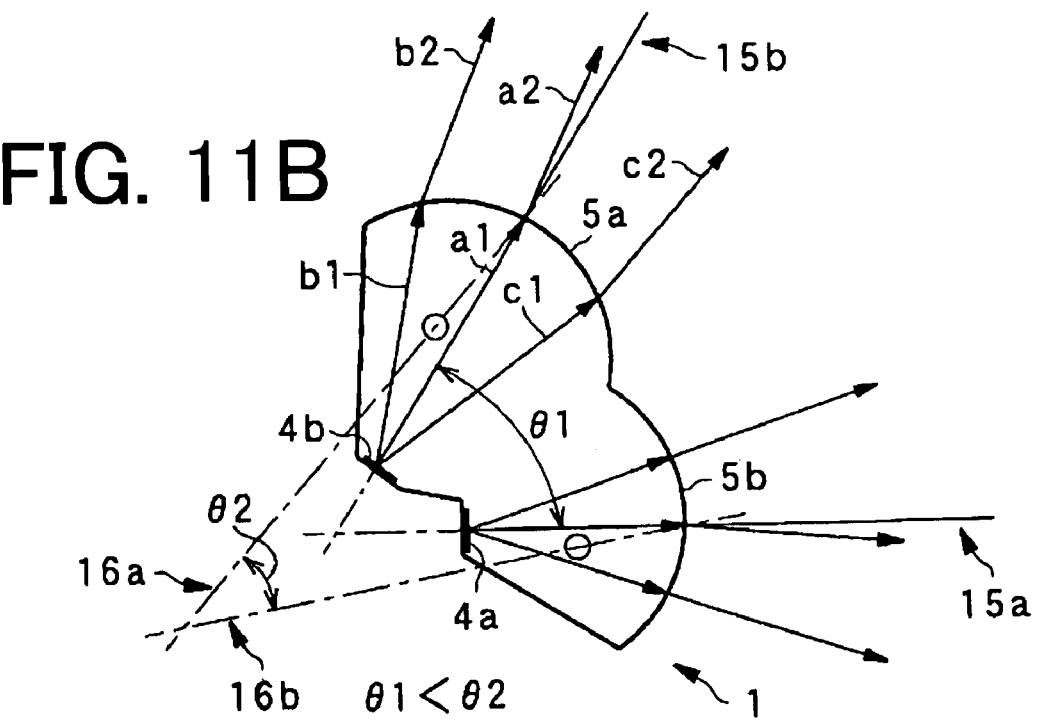
FIG. 11B is a projection drawings which is viewed from one end face in a longitudinal direction of a light guiding member 1 and which is shown for comparison with a light guiding member 1 according to a sixth embodiment.

A sixth embodiment of the present invention will be described, referring to FIGS. 11A and 11B. FIG. 11A is a projection drawing which is viewed from one end face in the longitudinal direction of a light guiding member 1 according to this embodiment, wherein the light guiding member 1 has a first light direction changing face 4a and a second light direction changing face 4b, and each of a light emitting face 5a and a light emitting face 5b has an independent semicircle shape in a cross sectional view. FIG. 11B is a projection drawing which is viewed from one end face in a longitudinal direction of the light guiding member 1 and which is shown for comparison with the light guiding member 1 shown in FIG. 11A. The other structural parts with reference numerals which are the same as those shown in FIG. 1 correspond to the structural parts of FIG. 1 with the same reference numerals. A line which is perpendicular to the first light direction changing face 4a shown as a line segment in the projection drawing, and which extends toward a light emitting face 5b from the center of the first light direction changing face 4a, is represented as a first vertical line 15a. Similarly, a line which is perpendicular to the second light direction changing face 4b shown as a line segment in the projection drawing, and which extends toward a light emitting face 5a from the center of the second light direction changing face 4b, is represented as a second vertical line 15b. These two vertical lines, that is, the first vertical line 15a and the second vertical line 15b intersect with each other, forming an angle θ1. A virtual plane which includes the first vertical line 15a or the second vertical line 15b, and which extends in the longitudinal direction of the light guiding member 1 is hereinafter referred to as "a vertical plane extending in the longitudinal direction with respect to the light direction changing face". The light guiding member 1 has two curved faces, the light emitting face 5a and the light emitting face 5b, wherein the two curved faces thereof are formed of approximately semicircles, respectively, which have the normal 16a of the light emitting face 5a and the normal 16b of the light emitting face 5b respectively, with respective angles different from each other, and the direction of the first vertical line 15a and that of the second vertical line 15b are different from each other.

In the light guiding member 1 shown in FIG. 11A, an angle θ2 which is formed by normals at intersection points where a vertical plane containing the first vertical line 15a and a vertical plane containing the second vertical line 15b intersect with the light emitting faces 5a and 5b respectively, is approximately equal to the intersection angle θ1 which is formed by the first vertical line 15a and the second vertical line 15b which intersect with each other. On the other hand, in the light guiding member 1 shown in FIG. 11B, the angle θ2 which is formed by normals at intersections where a vertical plane containing the first vertical line 15a and a vertical plane containing the second vertical line 15b intersect with the light emitting faces 5a and 5b respectively, is larger than the intersection angle θ1 which is formed by the first vertical line 15a and the second vertical line 15b which intersect with each other.

The angle area of the light emitting faces 5a and 5b of the light guiding member 1 shown in FIG. 11A, can be made smaller than the angle area of the light emitting faces 5a and 5b of the light guiding member 1 shown in FIG. 11B. Moreover, the angle of each light which is emitted from the light emitting face 5a or 5b of the light guiding member 1 shown in FIG. 11A, becomes larger than that of the light guiding member 1 of FIG. 11B. Therefore, as the light guiding member 1 shown in FIG. 11A, when the angle θ2 is equal to or smaller than the angle θ1, the first light direction changing face 4a, the second light direction changing face 4b, and the formation area of the light emitting faces 5a and 5b can be narrowed, so that the flexibility of the shape design can be increased.

The preceding description has been presented only to illustrate and describe exemplary embodiments of the present light guiding member and bifurcated linear light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:
1. A linear light source apparatus comprising:
a light guiding member and an LED, wherein:
   the LED is arranged at an end face of the linear light source apparatus;
   the light guiding member comprises:
      a transparent rod shape member having a first light direction changing face and a second light direction changing face, the first and second light direction changing faces extending in a longitudinal direction of the light guiding member; and
      a light emitting face which faces the first and second light direction changing faces;

wherein first and second vertical planes intersect with each other, the first and second vertical planes extending in the longitudinal direction and are vertical to the first and second light direction changing faces respectively.

2. The linear light source apparatus according to claim 1, wherein a relation of θ1≧θ2 is satisfied, when an intersection angle formed by the vertical planes at an intersection thereof is represented as θ1, and an angle which is formed by center-of-curvature lines which pass through respective two intersection points of the vertical faces and the light emitting face in a side of the light emitting face, is represented as θ2.

3. The linear light source apparatus according to claim 1, wherein one of the light direction changing faces is in a concave shape, with respect to a short side direction of the light guiding member.

4. The linear light source apparatus according to claim 2, wherein one of the light direction changing faces is in a concave shape, with respect to a short side direction of the light guiding member.

5. A linear light source apparatus according to claim 1, wherein the light emitting face is formed of two curved surfaces in which respective curvatures thereof are equal to or different from each other.

6. The linear light source apparatus according to claim 1, further comprising:
a reflection mirror which reflects the light emitted in one of the two directions, to the other direction of the two directions.

7. A linear light source apparatus comprising:
first and second light direction changing faces of a light guiding member extending in a longitudinal direction of the light guiding member, said first and second light direction changing faces being between end and optical incidence faces of the light guiding member;
first and second light emitting faces of the light guiding member extending in said longitudinal direction, said first and second light emitting faces being between said end and optical incidence faces of the light guiding member;
a light source configured to emit light along said longitudinal direction, said optical incidence face being between said light emitting and direction changing faces and said light source,
wherein said light reflected from said first light direction changing face becomes first light beams, said first light beams passing through said first light emitting face in a first vertical plane,
wherein said light reflected from said second light direction changing face becomes second light beams, said second light beams passing through said second light emitting face in a second vertical plane,
wherein said first and second vertical planes extend in said longitudinal direction, an intersection between said first and second vertical planes being at a dihedral angle.

8. The linear light source apparatus according to claim 7, wherein said light source is a light emitting diode.

9. The linear light source apparatus according to claim 7, wherein said first light emitting and direction changing faces are within said first vertical plane, said second light emitting and direction changing faces being within said second vertical plane.

10. The linear light source apparatus according to claim 7, wherein said first light beams diverge from said second light beams.

11. The linear light source apparatus according to claim 7, wherein said light guiding member is a transparent rod shape member.

12. The linear light source apparatus according to claim 7, wherein the light emitting face of the light guiding member is formed of two curved surfaces in which respective curvatures thereof are equal to or different from each other.

13. The linear light source apparatus according to claim 7, wherein said first light direction changing face has concavo-convex slots along said longitudinal direction.

14. The linear light source apparatus according to claim 7, wherein said second light direction changing face has concavo-convex slots along said longitudinal direction.

15. The linear light source apparatus according to claim 7, further comprising:
a reflection mirror configured to reflect said first light beams, said first light beams reflected by said reflection mirror becoming third light beams,
wherein said second and third light beams converge toward a document reading face.

* * * * *